(12) United States Patent
Wang et al.

(10) Patent No.: US 12,538,070 B2
(45) Date of Patent: Jan. 27, 2026

(54) SOUND-ABSORBING MATERIAL BLOCK, METHOD FOR PREPARING THE SAME AND ITS APPLICATION

(71) Applicant: AAC ACOUSTIC TECHNOLOGIES (SHENZHEN) CO., LTD., Shenzhen (CN)

(72) Inventors: Zhongyang Wang, Shenzhen (CN); Hezhi Wang, Shenzhen (CN); Jie Zhang, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 256 days.

(21) Appl. No.: 18/095,000

(22) Filed: Jan. 10, 2023

(65) Prior Publication Data

US 2024/0080615 A1    Mar. 7, 2024

Related U.S. Application Data

(63) Continuation of application No. PCT/CN2022/122708, filed on Sep. 29, 2022.

(30) Foreign Application Priority Data

Sep. 5, 2022 (CN) .......................... 202211077326.5

(51) Int. Cl.
| | |
|---|---|
| *C08J 9/42* | (2006.01) |
| *C09D 5/02* | (2006.01) |
| *C09D 7/20* | (2018.01) |
| *C09D 7/61* | (2018.01) |
| *C09D 109/08* | (2006.01) |
| *C09D 125/18* | (2006.01) |
| *C09D 133/04* | (2006.01) |
| *H04R 1/02* | (2006.01) |
| *H04R 1/28* | (2006.01) |

(52) U.S. Cl.
CPC ................ *H04R 1/288* (2013.01); *C08J 9/42* (2013.01); *C09D 5/022* (2013.01); *C09D 7/20* (2018.01); *C09D 7/61* (2018.01); *C09D 109/08* (2013.01); *C09D 125/18* (2013.01); *C09D 133/04* (2013.01); *H04R 1/025* (2013.01); *C08J 2205/05* (2013.01); *C08J 2379/02* (2013.01); *C08J 2405/04* (2013.01); *C08J 2409/08* (2013.01); *C08J 2425/18* (2013.01); *C08J 2433/02* (2013.01); *C08J 2433/04* (2013.01); *C08J 2433/26* (2013.01)

(58) Field of Classification Search
CPC .......... H04R 2400/11; H04R 2307/021; H04R 2307/023; H04R 2307/025; H04R 2307/207; C08J 2205/05; C08J 2405/04; C08J 2409/06; C08J 2361/22; C08J 2361/28; C08J 2375/06; C08J 2375/04; C08J 2375/05; C08J 9/42
USPC .......................................................... 252/62
See application file for complete search history.

(56) References Cited

U.S. PATENT DOCUMENTS

| | | | |
|---|---|---|---|
| 11,950,048 B2 * | 4/2024 | Wang .................... | C09D 125/14 |
| 2002/0132106 A1 * | 9/2002 | Dyer ..................... | C08J 9/0085 |
| | | | 156/60 |

* cited by examiner

*Primary Examiner* — Matthew E. Hoban
*Assistant Examiner* — Lynne Edmondson
(74) *Attorney, Agent, or Firm* — Wiersch Law Group

(57) ABSTRACT

A sound-absorbing material block, a method for preparing the same and application thereof are provided. The sound-absorbing material block includes three-dimensional open-cell foam, sound-absorbing material powder, a binder, a gel, and a cross-linking agent. The sound-absorbing material powder is bonded to each other and connected to the three-dimensional open-cell foam by means of the gel, the cross-linking agent, and the binder, by mass of the sound-absorbing material powder, the gel accounts for 1 wt % to 5 wt % of the sound-absorbing material powder, and the binder accounts for 1 wt % to 8 wt % of the sound-absorbing material powder, and by mass of the gel, the cross-linking agent accounts for 1 wt % to 10 wt % of the gel. The sound-absorbing material block according to the present disclosure reduces an additive amount of the binder, and significantly improves sound-absorbing performance and strength of the material block.

5 Claims, 3 Drawing Sheets

SOUND-ABSORBING MATERIAL BLOCK, METHOD FOR PREPARING THE SAME AND ITS APPLICATION

TECHNICAL FIELD

The present disclosure relates to the field of composite materials, and in particular, to a sound-absorbing material block, a method for preparing the sound-absorbing material block and application thereof.

BACKGROUND

Various mobile terminals have higher and higher requirements for audio quality. In order to improve the audio quality of the mobile terminals, at present, a common practice in the art is to fill a rear cavity of a speaker with a sound-absorbing material to increase a volume of a dummy rear cavity, so as to improve the audio quality.

Generally, sound-absorbing material powder is bonded together into a sphere by means of a binder to ensure excellent sound absorption performance. However, when sound-absorbing particles collide with each other, aging phenomena such as powder dropping and crushing will occur. In order to prevent this situation, there is a need to increase a proportion of the binder in the sound-absorbing material. However, the increase in the content of the binder may lead to blockage of a large number of mesopores or micropores in the sound-absorbing particles, greatly degrading the sound absorption performance. Therefore, in consideration of both performance and strength, the content of the binder in the sound-absorbing particles is required to be kept within a certain range, but this also limits improvement of the performance of the sound-absorbing material.

A solution of making the sound-absorbing material powder into blocks or directly molding the sound-absorbing material powder in the rear cavity is generally adopted in the art to increase strength of the sound-absorbing material, which reduces a risk of crushing the sound-absorbing particles, and improves the sound-absorbing performance. Such a solution is simple in process and can reduce the risk of crushing caused by collision. However, such sound-absorbing material blocks mostly have poor performance, material powder is prone to agglomeration, and problems of fracture and powder dropping of the material blocks may still occur.

Therefore, it is an urgent problem to be solved in the art to provide a sound-absorbing material block with high performance and high strength and a method for preparing the sound-absorbing material block.

SUMMARY

An objective of the present disclosure is to provide a sound-absorbing material block that can improve strength and performance of the sound-absorbing material block while reducing an additive amount of a binder.

The technical solution of the present disclosure is as follows: a sound-absorbing material block, wherein the sound-absorbing material block includes three-dimensional open-cell foam, sound-absorbing material powder, a binder, a gel, and a cross-linking agent;

wherein the sound-absorbing material powder is bonded to each other and connected to the three-dimensional open-cell foam by means of the gel, the cross-linking agent, and the binder, by mass of the sound-absorbing material powder, the gel accounts for 1 wt % to 5 wt % of the sound-absorbing material powder, and the binder accounts for 1 wt % to 8 wt % of the sound-absorbing material powder, and by mass of the gel, the cross-linking agent accounts for 1 wt % to 10 wt % of the gel.

As an improvement, the cross-linking agent is one or more of N, N'-methylene diacrylamide, boric acid, calcium chloride, and aluminum chloride.

As an improvement, the three-dimensional open-cell foam has a porosity greater than 60%, and a density ranging from 10 $mg/cm^3$ to 100 $mg/cm^3$.

As an improvement, the three-dimensional open-cell foam is melamine foam or polyurethane foam.

As an improvement, the sound-absorbing material powder is a zeolite material consisting of one or more of an MFI molecular sieve, an MEL molecular sieve, and an FER molecular sieve with Si/Al ratios greater than 100 and particle sizes less than 10 μm.

As an improvement, the binder is one or more of polyacrylate, styrene-butadiene emulsion, polystyrene acrylate, polystyrene acetate, polyurethane resin, and polyethyl vinyl acetate.

As an improvement, the gel is one or more of sodium carboxymethyl cellulose, sodium alginate, chitosan, sodium polyacrylate, polyacrylamide, gelatin, and polyvinyl alcohol.

In another aspect, the present disclosure further provides a method for preparing the sound-absorbing material block according to the present disclosure, wherein the method includes the following steps:

S1: blending the sound-absorbing material powder, the gel, and the binder with a solvent to form a slurry A;

S2: adding the cross-linking agent to the slurry A while stirring evenly to obtain a slurry B;

S3: adding the slurry B to the three-dimensional open-cell foam, and aging to form a gel in the three-dimensional open-cell foam;

S4: drying a sample aged; and

S5: dehydrating the sample dried to obtain the sound-absorbing material block.

As an improvement, the solvent is one or more of water, methanol, ethanol, butanol, and ethyl acetate.

Correspondingly, the present application further provides a speaker, the speaker including: a housing with an accommodation space, a sound-producing unit arranged in the housing, and a rear cavity enclosed by the sound-producing unit and the housing, wherein the rear cavity is filled with the sound-absorbing material block according to the present disclosure.

According to the method in the present disclosure, in step S1 of forming the slurry A, the sound-absorbing material powder, the gel, and the binder are blended with the solvent by using any method known in the art, optionally blended under conditions of room temperature while stirring, and more optionally blended under the application of ultrasound. Blending time is not limited, provided that uniform mixing can be realized. Uniform mixing may be realized generally after 30 min to 120 min.

According to the method in the present disclosure, in step S2 of forming the slurry B, stirring time is not limited, provided that uniform mixing can be realized. Uniform mixing may be realized generally after 5 min to 30 min, optionally at room temperature.

According to the method in the present disclosure, in step S3 of forming a gel, the slurry B is added to the three-dimensional open-cell foam by using any method known in the art. Optionally, the slurry B is added dropwise to the three-dimensional open-cell foam, and is aged optionally at room temperature. Aging time generally ranges from 30 min to 120 min.

According to the method in the present disclosure, in step S4 of drying, drying is carried out using any method known in the art, optionally by freeze drying.

According to the method in the present disclosure, in step S5 of dehydration, dehydration may be carried out by using any method known in the art, optionally by baking. A baking temperature generally ranges from 50° C. to 100° C., and baking time generally ranges from 1 h to 6 h.

In still another aspect, the present application relates to application of the sound-absorbing material block to speakers of electronic devices. Such electronic devices include, but are not limited to, smart phones, watches, tablet computers, smart speakers, notebook computers, TV, automobiles, and the like.

When the sound-absorbing material block according to the present disclosure is applied to a speaker, the three-dimensional open-cell foam may be first cut into a shape that adapts into a rear cavity of the speaker, for example, a sphere, an ellipsoid, a tetrahedron, a hexahedron, or any other shape that adapts into the rear cavity of the speaker.

Compared with the related art, the present disclosure has the following advantages.

Firstly, when preparing a sample, a gel and a cross-linking agent are added and a cross-linking structure is formed, which can reduce an additive amount of the binder and thus may not block holes on a surface of the sound-absorbing powder material, so as to improve sound absorption performance.

Secondly, the double action of a cross-linked structure of the gel and a foam framework can significantly improve strength of the sample with a low content of the binder.

In addition, the gel can make the sound-absorbing powder dispersed uniformly in the solvent, which is not prone to agglomeration and may not settle even if standing for a long time, facilitating industrial production.

Finally, according to the present disclosure, the preparation process is simple, sound absorption performance and strength of the sound-absorbing material block can be improved, and assembling efficiency of the sound-absorbing material can also be improved.

These and other objectives, aspects, and advantages of the present disclosure will become apparent according to the following description of the present disclosure and with reference to accompanying drawings.

DESCRIPTION OF EMBODIMENTS

In the present application, the term "room temperature" refers to an ambient temperature in a range of 18° C. to 25° C.

A new sound-absorbing material block is prepared in the present disclosure by using three-dimensional open-cell foam as a bracket, and bonding and connecting sound-absorbing material powder to the three-dimensional open-cell foam bracket by means of a gel, a cross-linking agent, and a binder. The sound-absorbing material block prepared in the present disclosure not only has excellent sound absorption performance, but also has significantly improved strength.

Further description is provided below through embodiments. It should be understood that specific embodiments described herein are intended only to interpret the present disclosure but not to limit the present disclosure.

PREPARATION EXAMPLES

Example 1

A sound-absorbing material block was prepared according to the following steps in this embodiment.

0.05 g of sodium alginate was weighed, and was added to 8 g of water at room temperature and stirred therewith for 20 min to form a uniform and transparent sodium alginate aqueous solution. Then, 4 g of a zeolite material and 0.2 g (solid content of 50 wt %) of styrene-butadiene emulsion were added to the sodium alginate aqueous solution, and were continuously stirred therewith and treated by ultrasound for 20 min, to obtain a slurry A. The zeolite material consisted of one or more of an MFI molecular sieve, an MEL molecular sieve, and an FER molecular sieve with Si/Al ratios greater than 100 and particle sizes less than 10 μm.

0.005 g of calcium chloride was added to the slurry A and stirred therewith at room temperature for 10 min to obtain a slurry B.

The slurry B was sucked and added dropwise to a melamine foam material, and aged at room temperature for 60 min. The melamine foam has a density ranging from 10 mg/cm$^3$ to 100 mg/cm$^3$ and a porosity greater than 60%.

Then, an aged sample was frozen and dried using a freeze dryer.

Upon completion of the freezing and drying, an obtained sample was placed in an environment of 80° C. and baked for 2 h for dehydration to obtain the required sound-absorbing material block.

Figure 1:
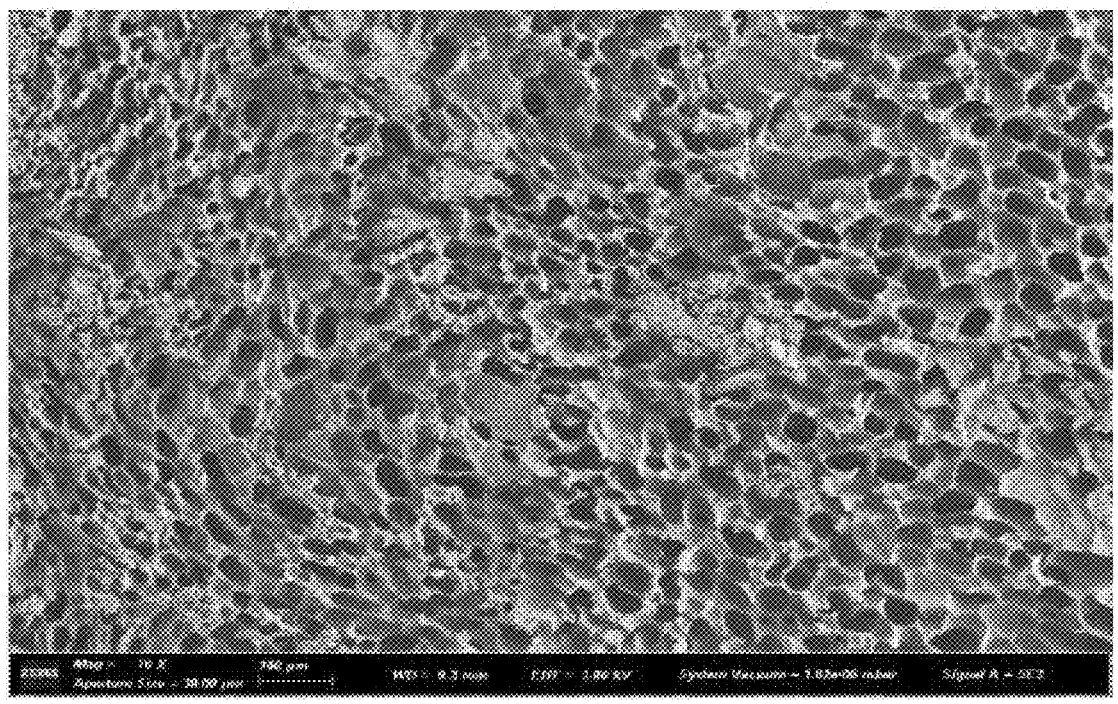
FIG. 1 illustrates a scanning electron microscope (SEM) image of a surface of a sound-absorbing material block according to Example 1 of the present disclosure.
Figure 2:
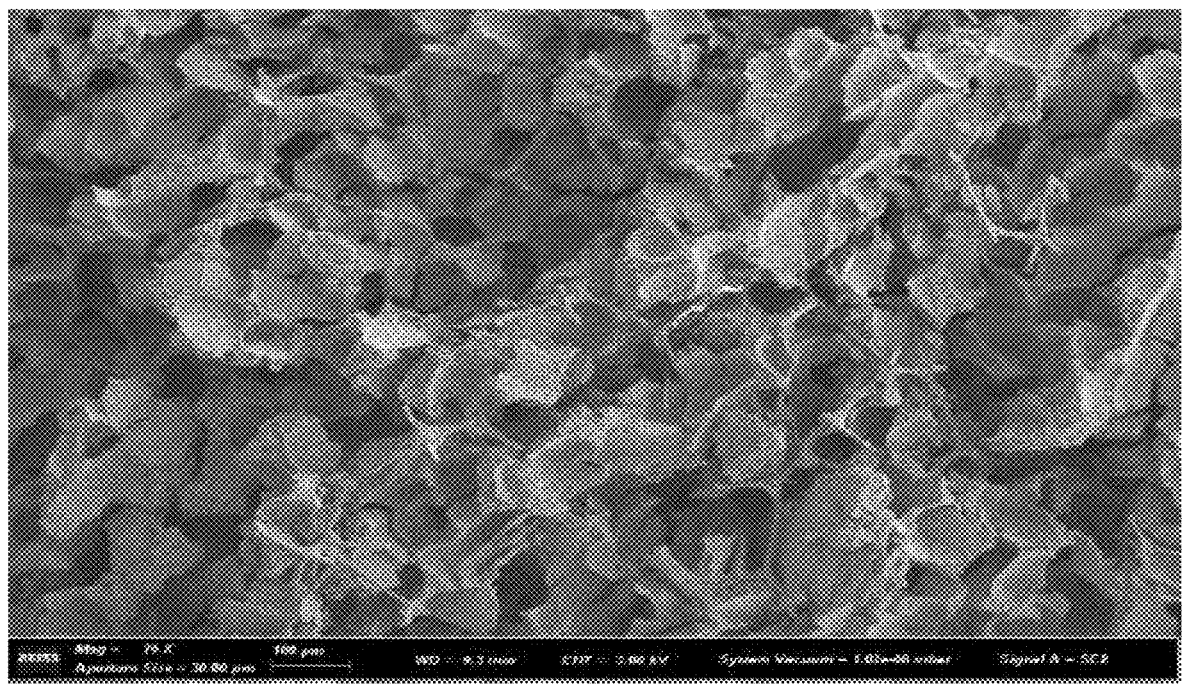
FIG. 2 illustrates an SEM image of a cross section of the sound-absorbing material block according to Example 1 of the present disclosure under 100 μm.
Figure 3:
FIG. 3 illustrates an SEM image of the cross section of the sound-absorbing material block according to Example 1 of the present disclosure under 20 μm.

A surface and a cross section of the obtained sound-absorbing material block were scanned by an SEM respectively. An SEM image of the surface of the sound-absorbing material block was shown in FIG. 1, and SEM images of the cross section were shown in FIG. 2 and FIG. 3. As can be obviously seen from the drawings, in the melamine foam, zeolite material powder was bonded to each other to form a gel cross-linked structure connected to a melamine foam bracket.

Example 2

A sound-absorbing material block was prepared according to the following steps in this embodiment.

0.08 g of polyacrylamide was weighed, and was added to 8 g of water at room temperature and stirred therewith for 20 min to form a uniform and transparent polyacrylamide aqueous solution. Then, 5 g of a zeolite material and 0.15 g (solid content of 50 wt %) of polystyrene acetate were added to the polyacrylamide aqueous solution, and were continuously stirred therewith and treated by ultrasound for 20 min, to obtain a slurry A. The zeolite material consisted of one or more of an MFI molecular sieve, an MEL molecular sieve, and an FER molecular sieve with Si/Al ratios greater than 100 and particle sizes less than 10 μm.

0.005 g of N, N'-methylene diacrylamide was added to the slurry A and stirred therewith at room temperature for 10 min to obtain a slurry B.

The slurry B was sucked and added dropwise to a melamine foam material, and aged at room temperature for 60 min. The melamine foam has density ranging from 10 mg/cm$^3$ to 100 mg/cm$^3$ and porosity greater than 60%.

Then, an aged sample was frozen and dried using a freeze dryer.

Upon completion of the freezing and drying, an obtained sample was placed in an environment of 80° C. and baked for 2 h for dehydration to obtain the required sound-absorbing material block.

A surface and a cross section of the obtained sound-absorbing material block were scanned by an SEM respectively. Obtained SEM images were similar to those in Example 1. As can be obviously seen from the drawings, in the melamine foam, zeolite material powder was bonded to each other to form a gel cross-linked structure connected to a melamine foam bracket.

Example 3

A sound-absorbing material block was prepared according to the following steps in this embodiment.

0.1 g of sodium polyacrylate was weighed, and was added to 8 g of water at room temperature and stirred therewith for 20 min to form a uniform and transparent sodium polyacrylate aqueous solution. Then, 4.5 g of a zeolite material and 0.3 g (solid content of 50 wt %) of polyacrylate were added to the sodium polyacrylate aqueous solution, and were continuously stirred therewith and treated by ultrasound for 40 min, to obtain a slurry A. The zeolite material consisted of one or more of an MFI molecular sieve, an MEL molecular sieve, and an FER molecular sieve with Si/Al ratios greater than 100 and particle sizes less than 10 μm.

0.008 g of N, N'-methylene diacrylamide was added to the slurry A and stirred therewith at room temperature for 10 min to obtain a slurry B.

The slurry B was sucked and added dropwise to a polyurethane foam material, and aged at room temperature for 60 min. The polyurethane foam has density ranging from 10 mg/cm$^3$ to 100 mg/cm$^3$ and porosity greater than 60%.

Then, an aged sample was frozen and dried using a freeze dryer.

Upon completion of the freezing and drying, an obtained sample was placed in an environment of 80° C. and baked for 2 h for dehydration to obtain the required sound-absorbing material block.

A surface and a cross section of the obtained sound-absorbing material block were scanned by an SEM respectively. Obtained SEM images were similar to those in Example 1. As can be obviously seen from the drawings, in the polyurethane foam, zeolite material powder was bonded to each other to form a gel cross-linked structure connected to a polyurethane foam bracket.

Comparative Example 1

A sound-absorbing material block was prepared according to the following steps in this comparative example.

0.05 g of sodium alginate was weighed, and was added to 8 g of water at room temperature and stirred therewith for 20 min to form a uniform and transparent sodium alginate aqueous solution. Then, 4 g of a zeolite material and 0.1 g (solid content of 50 wt %) of styrene-butadiene emulsion were added to the sodium alginate aqueous solution, and were continuously stirred therewith and treated by ultrasound for 20 min, to obtain a slurry A. The zeolite material consisted of one or more of an MFI molecular sieve, an MEL molecular sieve, and an FER molecular sieve with Si/Al ratios greater than 100 and particle sizes less than 10 μm.

The slurry A was sucked and added dropwise to a melamine foam material, and aged at room temperature for 60 min. The melamine foam has density ranging from 10 mg/cm$^3$ to 100 mg/cm$^3$ and porosity greater than 60%.

Then, an aged sample was frozen and dried using a freeze dryer.

Upon completion of the freezing and drying, an obtained sample was placed in an environment of 80° C. and baked for 2 h for dehydration to obtain the required sound-absorbing material block.

Comparative Example 2

A sound-absorbing material block was prepared according to the following steps in this comparative example.

0.08 g of polyacrylamide was weighed, and was added to 8 g of water at room temperature and stirred therewith for 20 min to form a uniform and transparent polyacrylamide aqueous solution. Then, 4 g of a zeolite material and 0.8 g (solid content of 50 wt %) of polystyrene acetate were added to the polyacrylamide aqueous solution, and were continuously stirred therewith and treated by ultrasound for 20 min, to obtain a slurry A. The zeolite material consisted of one or more of an MFI molecular sieve, an MEL molecular sieve, and an FER molecular sieve with Si/Al ratios greater than 100 and particle sizes less than 10 μm.

The slurry A was sucked and added dropwise to a melamine foam material, and aged at room temperature for 60 min. The melamine foam has density ranging from 10 mg/cm$^3$ to 100 mg/cm$^3$ and porosity greater than 60%.

Then, an aged sample was frozen and dried using a freeze dryer.

Upon completion of the freezing and drying, an obtained sample was placed in an environment of 80° C. and baked for 2 h for dehydration to obtain the required sound-absorbing material block.

Comparative Example 3

A sound-absorbing material block was prepared according to the following steps in this comparative example.

0.05 g of sodium alginate was weighed, and was added to 8 g of water at room temperature and stirred therewith for 20 min to form a uniform and transparent sodium alginate aqueous solution. Then, 4 g of a zeolite material and 0.2 g (solid content of 50 wt %) of styrene-butadiene emulsion were added to the sodium alginate aqueous solution, and were continuously stirred therewith and treated by ultrasound for 20 min, to obtain a slurry A. The zeolite material consisted of one or more of an MFI molecular sieve, an MEL molecular sieve, and an FER molecular sieve with Si/Al ratios greater than 100 and particle sizes less than 10 μm.

0.005 g of calcium chloride was added to the slurry A and stirred therewith at room temperature for 10 min to obtain slurry B.

The slurry B was sucked and added dropwise to a polytetrafluoroethylene mold, and aged at room temperature for 60 min.

Then, an aged sample was frozen and dried using a freeze dryer.

Upon completion of the freezing and drying, an obtained sample was placed in an environment of 80° C. and baked for 2 h for dehydration to obtain the required sound-absorbing material block.

Test of Acoustic Performance

Acoustic performance of the sound-absorbing material blocks according to Examples 1-3 and Comparative Examples 1-3 was tested compared with conventional sound-absorbing particles.

According to a method for measuring a resonant frequency of a speaker, the sound-absorbing material blocks according to Examples 1-3 and Comparative Examples 1-3 were respectively placed in test tools, values of decline in a resonant frequency (F0) thereof (i.e., ΔF0) were tested using an impedance analyzer. F0 decline denotes a degree to which the resonant frequency moves to a low frequency. Generally, the greater the ΔF0, the better the low-frequency performance of the speaker.

In an experiment, each sample was prepared into a cube of 10 mm*12 mm*2 mm/0.24 cubic centimeter (0.4 cc for short), a volume of the conventional sound-absorbing particles was also 0.24 cc, and volumes of rear cavities of speakers of the test tools are all 0.4 cc.

In addition, dropping and breakage of the sound-absorbing material blocks according to Examples 1-3 and Comparative Examples 1-3 were also tested through a dropping test.

Test results were shown in the following table.

| Sample | ΔF0 (Hz) | Dropping and breakage |
| --- | --- | --- |
| Example 1 | 203 | No powder dropping |
| Example 2 | 194 | No powder dropping |
| Example 3 | 201 | No powder dropping |
| Comparative Example 1 | 207 | Powder dropping |
| Comparative Example 2 | 146 | No powder dropping |
| Comparative Example 3 | 198 | Fracture, powder dropping |
| Conventional sound-absorbing particle | 186 | No powder dropping |

It can be known according to the data in the above table that the sound absorption performance of the sound-absorbing material blocks according to Examples 1-3 of the present disclosure were all better than that of the conventional sound-absorbing particles, and had no powder dropping. Differences in performance of Examples 1-3 were caused by addition of different gels and differences in the additive content of zeolite.

Although the sample in Comparative Example 1 had better sound absorption performance than that in Example 1, the sample had serious powder dropping, which was caused by no addition of a cross-linking agent and no formation of a gel cross-linked structure by sound-absorbing powder. The content of the binder was increased in Comparative Example 2, but no cross-linking agent was added. Although the sample in Comparative Example 2 passed through the dropping test and had no powder dropping, the sound absorption performance thereof was degraded seriously. In Comparative Example 3, the slurry B was directly dried in a mold. Although the sample had better sound absorption performance, fracture and powder dropping occurred after the sample dropped due to the absence of support by a foam bracket.

The objectives, technical solutions, and beneficial effects of the present disclosure are described in detail above. It should be understood that the above descriptions are merely embodiments and specific examples of the present disclosure, and are not intended to limit the protection scope of the present disclosure. Any modification, equivalent replacement, improvement, and the like made within the spirit and principle of the present disclosure shall fall within the protection scope of the present disclosure.

What is claimed is:

1. A sound-absorbing material block, comprising three-dimensional open-cell foam, sound-absorbing material powder, a binder, a gel, and a cross-linking agent;
    wherein the sound-absorbing material powder is bonded to each other and connected to the three-dimensional open-cell foam by means of the gel, the cross-linking agent, and the binder, by mass of the sound-absorbing material powder, the gel accounts for 1 wt % to 5 wt % of the sound-absorbing material powder, and the binder accounts for 1 wt % to 8 wt % of the sound-absorbing material powder, and by mass of the gel, the cross-linking agent accounts for 1 wt % to 10 wt % of the gel;
    wherein the sound-absorbing material powder is a zeolite material consisting of one or more of an MFI molecular sieve, an MEL molecular sieve, and an FER molecular sieve with Si/Al ratios greater than 100 and a particle size less than 10 μm;
    wherein the cross-linking agent is one or more of N,N'-methylene diacrylamide, boric acid, calcium chloride, and aluminum chloride.

2. The sound-absorbing material block as described in claim 1, wherein the three-dimensional open-cell foam has a porosity greater than 60%, and a density ranging from 10 mg/cm3 to 100 mg/cm3.

3. The sound-absorbing material block as described in any one of claim 1, wherein the three-dimensional open-cell foam is melamine foam or polyurethane foam.

4. The sound-absorbing material block as described in claim 1, wherein the binder is one or more of polyacrylate, styrene-butadiene emulsion, polystyrene acrylate, polystyrene acetate, polyurethane resin, and polyethyl vinyl acetate.

5. The sound-absorbing material block as described in claim 1, wherein the gel is one or more of sodium carboxymethyl cellulose, sodium alginate, chitosan, sodium polyacrylate, polyacrylamide, gelatin, and polyvinyl alcohol.

* * * * *